United States Patent Office 2,849,334
Patented Aug. 26, 1958

2,849,334

PROCESS OF FORMING AN INSOLUBILIZED PROTEIN FILM ON A BASE

Robert T. Hart, Gorham, Maine, assignor to S. D. Warren Company, Boston, Mass., a corporation of Massachusetts No Drawing. Application November 4, 1954
Serial No. 466,942

2 Claims. (Cl. 117—64)

This invention relates to a method of making water-resistant modified proteins; also to water-resistant modified proteins; also to liquid compositions which deposit residues of said modified proteins when the liquid media of said liquid compositions are evaporated; also to dry or wet mixtures of the essential ingredients of said liquid compositions, excluding the ammonia or equivalent agent. The invention includes the products or compositions disclosed herein, without limitation to their method of manufacture.

The invention also includes base materials, such as paper, wood, plaster and others, which have a coating layer which consists of the modified proteins or which includes the modified proteins as an adhesive or bonding agent.

The invention also includes independent or self-supporting films which consist of or include the modified proteins, in distinction to films which are coating layers.

The starting animal proteins which are modified according to this invention, are exemplified by casein, without limitation thereto.

The starting vegetable proteins which are modified according to this invention, are exemplified, without limitation thereto, to the soy protein which is extracted from the soy bean.

Casein and soy proteins are the highly preferred starting proteins, because they have special and critical common properties which adapt them particularly for use in the methods disclosed herein.

Taking casein as an example, it is well-known that casein can be easily colloidally dispersed in water and in various mixed solvents which provide a volatile liquid dispersing medium that can be easily evaporated at moderate temperature. For commercial purposes, casein is colloidally dispersed in an alkaline aqueous medium in which the dissolved alkaline agent reacts with the casein to form a "soluble" caseinate. The dissolved alkaline agent in said aqueous dispersion is exemplified by ammonia, and by various salts of the alkali metals which in aqueous solution give an alkaline reaction, such as tetrasodium pyrophosphate, $Na_4P_2O_7$.

These colloidal dispersions of casein are often designated as solutions, but they are not true solutions, because the dispersed casein can be separated from the water of the dispersion by ultrafiltration.

These colloidal dispersions of casein have been used for many purposes. Thus, they have been used as impregnating agents, as in sizing paper. They have also been used as adhesives. They have also been used as bonding agents in paints, and in coatings on paper and other base materials. In such case, the dispersion is supplemented with pigments. Casein has also been used in making self-supporting or independent films, as distinguished from coating films which are supported on paper, wood, or other base materials. It has also been used in making fibers.

However, dry casein readily adsorbs water. Hence, when casein is used as an adhesive, or as or in a coating, or as a bonding agent in paints and coatings, or in making a dry self-supporting film, the casein which is deposited by evaporating the liquid medium of an ordinary dispersion or solution of the casein, is readily attacked by water and it adsorbs water vapor from the air, so that the casein is not water-resistant. For this reason, it has been proposed to use an aqueous solution of formaldehyde to render the casein water-resistant, but development of the water-resistance is rather slow and is not as complete as desired or as is obtained by practice of the present invention.

It is of course possible, and in some cases advantageous, to use an aldehyde combined with ammonia, e. g. hexamethylenetetramine, in conjunction with the complex multivalent metal compounds hereinafter described. The effects of the multivalent metal ion and the aldehyde in promoting insolubility of the protein are to some extent additive, since the two agents are believed in general to react preferentially with different groups in the protein molecule.

In the preferred embodiment of the invention, the casein is colloidally dispersed or dissolved in an alkaline aqueous medium, to form a caseinate.

It is well-known that casein is precipitated from such colloidal dispersions, by dissolving precipitating multivalent salts in the liquid medium of said dispersion. For the purposes herein, a multivalent metal ion is defined as a metal ion which has a positive valence of three or more, and a multivalent salt is defined as a salt which has a metal cation whose valence is three or more. These precipitating multivalent metal salts are exemplified by aluminum sulfate, $Al_2(SO_4)_3$; ferric chloride, $FeCl_3$; and others which are later disclosed.

It has been proposed to evaporate the liquid medium of an alkaline aqueous dispersion of casein in order to provide an initial dry residual coating layer of casein and then to improve the water-resistance of said previously dried casein coating, by applying an aqueous solution of a multivalent salt to the outer face of said casein coating. These aqueous solutions are exemplified by aqueous solutions of aluminum chloride and aluminum formate. These aqueous solutions exert a surface effect on the previously dried layer of casein and improve the water-resistance of the casein. This improvement is limited substantially to a very thin outer surface layer of the previously dried casein coating or layer. If the final dry coating layer is rubbed or abraded on its outer face, the remaining inner part of the coating layer has little or no resistance to water. At least, the resistance to water is not equal and uniform throughout the entire thickness of the casein coating layer, if such layer had appreciable operative thickness.

Hence, though it has been well-known for many years that multivalent metal ions greatly improve the water-resistance of casein, much more than divalent metal ions, an efficient and low-cost method of using multivalent metal ions directly in a dispersion or solution of casein has not been heretofore discovered.

The above statements apply to soy protein.

According to this invention, the multivalent metal ions, which ordinarily act as precipitation ions, and which normally form water-insoluble hydroxides under the action of alkaline hydroxides, are incorporated in a new basic inner complex salt. An inner complex salt is defined as being a member of a special class of internal salts, in which an acid group and a neutral group coordinate with metals to form a cyclic complex or ring complex.

It is believed that the new metal complexes have cyclic structures of the type which are designated as chelate rings. Chelate rings are described by Morgan and Drew in "J. Chem. Soc.," vol. 117, page 1457, published in 1920; by Morgan and Smith in "J. Soc. Dyers Colourists," vol. 41, page 233, published in 1925; by Diehl "Chem. Rev.," vol. 21, page 39, published in 1937, and by Hilbert, Wulf, Hendricks and Liddel in "J. Am. Chem. Soc.," vol. 58, pages 548 and 1991, published in 1936.

It is believed that the new metal complexes are of the coordinate covalent type and of the intramolecular type.

It is also believed that these rings are of the relatively stable type, which have five members or six members. In this type, the metallic ion is held in the ring on one side by a normal covalent linkage and on the other side by a coordinate link.

Hence in its broader aspect the invention includes use of a compound of the chelate type which is relatively stable and soluble in alkaline aqueous medium and which contains in its ring one or more multivalent metal atoms, one or more anions of a carboxylic acid, and one or more hydroxyl radicals preferably supplied by a relatively volatile base.

The multivalent metal ions are non-precipitating as hydroxides in the new basic inner complex salts. Said new basic inner complex salts are soluble in alkaline water, such as ammonia water. When the alkaline aqueous solutions of said new basic inner complex salts are mixed with an alkaline aqueous colloidal dispersion of casein or soy protein, a new combination dispersion is formed, in which the protein remains colloidally dispersed, and the multivalent metal ions are not precipitated as their hydroxides, so that the new inner complex salt remains dissolved. The pH of the new combination dispersion is above seven.

From information available from a thorough search of the literature, it is probable that the aluminum ion, for example, is included in a complex ion of the following type:

$$[Al_2(C_4O_6H_4)_3(OH)_2]^=$$

each of which is presumed to be balanced in solution by the presence of two ammonium $(NH_4)^+$ ions.

Now, in a mixture containing aluminum ions, caseinate ions, hydroxyl ions, and tartrate ions, three courses of reaction are open: the formation of insoluble aluminum hydroxide, the formation of insoluble aluminum caseinate, or the formation of a soluble basic aluminum tartrate complex as above shown. That the latter occurs must mean only that the equilibrium constant ($K_{eq}$) for the complex must be smaller than either of the solubility product constants ($K_{sp}$) governing the precipitation of aluminum hydroxide or aluminum caseinate. However, this soluble complex can be maintained in a stable state only as long as that concentration of hydroxyl ions required for the complex is sustained. If these hydroxyl ions are furnished from a volatile base, i. e. ammonium hydroxide, and the solution is heated, with the consequent loss of ammonia and the conversion of hydroxyl ions to water, then the complex cannot be maintained and the aluminum ions are freed to participate in the reaction next most favored by its environment. This reaction is the desired one of formation of insoluble aluminum caseinate, and thus can be seen to be initiated by the action of heat.

When the water or other liquid medium of the new combination dispersion is evaporated, the complex metal salt is broken down and the multivalent metal ions are released. The multivalent metal ions are thus released gradually and react with the fine particles of protein, while the liquid medium is evaporated, or gradually during a period which begins when said evaporation has reached a critical stage. The multivalent metal ions are thus released so that all their three or more valences become operative. The multivalent metal ions thus react in situ with the fine dispersed particles or protein, at the entire surfaces of said fine dispersed particles. The liquid medium of the new combination dispersion may be evaporated at ordinary room temperature of 20° C.–30° C. or at higher temperature, in air at normal atmospheric pressure of 760 millimeters of mercury. As one example of a higher temperature, this temperature may be the temperature at which the wet coating of paper is set or dried according to standard practice, about 125° C.

If the only suspended particles in the new combination dispersion are protein particles, a dry residual self-supporting film or coating layer is formed of the final modified protein, in which the modified protein is water-resistant and even may become repellent or hydrophobic.

If the suspended particles in the combination dispersion include suspended particles of mineral pigment or other supplemental particles, the final modified protein in the dry residue has the same desirable properties, said final modified protein is a good bonding and adhesive agent and the entire layer is water-resistant.

In either case, the final modified protein is immediately uniformly and equally water resistant throughout the entire thickness of the self-supporting film or coating layer, even if it is thick.

As one general preliminary example, the reactants which are used to make the new basic inner complex salt or basic metal complex, are aluminum sulfate, tartaric acid, and ammonia water. The ammonia in the ammonia water may be replaced by other alkali or base, in whole or in part, as long as the new basic metal complex is broken when the liquid medium of the protein dispersion is evaporated. The tartaric acid may be the ordinary anhydrous dextro-tartaric acid.

The formula of tartaric acid is,

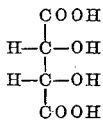

It has two carboxyl (COOH) groups and two hydroxyl (OH) groups.

A one-tenth normal solution thereof has a pH value of 2.2.

An aqueous solution of the aluminum sulfate and of the tartaric acid is made.

This solution is added to an aqueous solution of ammonia.

Ordinarily, ammonium hydroxide, like other alkaline hydroxides, precipitates aluminum hydroxide from an aqueous solution of aluminum sulfate, and the precipitate remains undissolved, even in the presence of excess ammonia.

However, under the conditions stated herein, there is no precipitation of aluminum hydroxide, and a clear solution of the new basic metal complex is formed. This solution is stable, if it contains free or uncombined hydroxyl ions from ammonium hydroxide or equivalent. It is highly preferred to use only ammonia water.

If the ammonia is driven off from the solution of the new metal complex, the new metal complex is broken, and the aluminum ions are released.

If the alkaline solution of the new metal complex is mixed with a colloidal aqueous alkaline dispersion of casein or soy protein, a new combination and stable alkaline dispersion is produced, in which the particles of protein remain dispersed and there is no precipitation of an aluminum compound.

The new combination dispersion also has excess free or uncombined ammonia dissolved therein, in the form of ammonium hydroxide, to keep said new combination dispersion stable.

When the liquid medium of the new combination dispersion is evaporated, thus driving off the excess ammonia, the new dissolved metal complex is broken during said evaporation, thus releasing the aluminum ions with their three valences, and modifying the fine particles of protein in situ in the dispersion by the reaction of said particles with the released metal ions, at the entire surfaces of the fine and dispersed particles of protein.

The dry residue of modified protein is formed gradually with bonding and adhesive properties. The formation of said residue proceeds in the same manner as when the water of an ordinary aqueous alkaline dispersion is evaporated. That is, there is no sudden precipitation of the modified protein.

Instead of using tartaric acid, which is an example of hydroxy carboxylic acids, other hydroxy carboxylic acids can be used. These hydroxy carboxylic acids may be aliphatic, with their carbon atoms arranged in chains only. These hydroxy carboxylic acids may be aromatic, namely, derived from benzene, $C_6H_6$; or from derivatives of benzene; or from any organic compound containing a closed ring. If aromatic, the acids preferably are derived from benzene. The hydroxy carboxylic acids may be either alpha acids or beta acids. Alpha acids are highly preferred. The carboxylates of these acids, namely, the salts and esters of these acids, are equivalent to the acids themselves, in supplying the respective anions. The acids may be monobasic, dibasic or polybasic. They may have one or more hydroxy "OH" groups.

As indicating that a new basic metal complex is made, the ratio between the weights of the dissolved aluminum sulfate and the dissolved tartaric acid, as one example, need not be the ratio which is required for the theoretical production of aluminum tartrate, $Al_2(C_4H_4O_6)_3$.

Aluminum tartrate is made commercially by dissolving alumina, $Al_2O_3$, in an aqueous solution of tartaric acid. The equation is, $$Al_2O_3 + 3H_2(C_4H_4O_6) = 3H_2O + Al_2(C_4H_4O_6)_3$$

In order theoretically to produce aluminum tartrate in aqueous solution by reacting aluminum sulfate and tartaric acid, the theoretical reaction is, $$Al_2(SO_4)_3 + 3H_2(C_4H_4O_6) = 3H_2SO_4 + Al_2(C_4H_4O_6)_3$$

The formula weight or molecular weight of $Al_2(SO_4)_3$ is 342.12.

The molecular weight or formula weight of anhydrous tartaric acid is 150.05.

The above theoretical equation requires 342.12 grams of $Al_2(SO_4)_3$ per 450.15 grams of anhydrous tartaric acid.

This corresponds substantially to one gram of $$Al_2(SO_4)_3$$

per 1.3 grams of anhydrous tartaric acid.

However, as later shown in numerous examples, the weight of the tartaric acid or other acid which is used to make the new metal complex may, in many cases, be less than the theoretical weight.

Thus, in one of the examples later stated herein, 25 units by weight of hydrated aluminum sulfate, $$Al_2(SO_4)_3 \cdot 18H_2O$$

and ten units by weight of anhydrous tartaric acid, are dissolved in 75 units by weight of water. The formula weight or molecular weight of said hydrated aluminum sulfate is 666.40.

Hence, the solution has substantially 12.8 units of $Al_2(SO_4)_3$.

In the theoretical reaction, this would require substantially 16.64 units of tartaric acid, instead of the 10 units of tartaric acid which are sufficient as one of the reactants.

In said example, the 75 units of the solution of aluminum sulfate and tartaric acid, are mixed with 25 units of 28% ammonia water. This ammonia water has 7 units of dissolved ammonia, which corresponds to substantially 15 units of ammonium hydroxide, $NH_4OH$.

This amount of dissolved ammonia is much more than is required to precipitate all of the ionic aluminum of the aluminum sulfate, in the form of aluminum hydroxide.

Since a clear and colorless and stable solution is produced, it is clear that the solution contains a dissolved metal complex. This solution has a substantial excess of free or uncombined ammonia in the form of ammonium hydroxide.

The use of an excess of ammonium hydroxide applies to all of the examples of making the new dissolved metal complex.

The weight of the tartaric acid and of many other acids, may be from 50% to 100% of the theoretical weight which is required to react with a multivalent salt of the precipitating type, in order to produce the corresponding ordinary multivalent salt of the acid.

However, in certain cases, if the minimum amount of the acid which would be required theoretically to make the salt of the acid, is used in making the aqueous alkaline solution of the basic metal complex, the addition of the alkaline aqueous solution of the basic metal complex to the alkaline aqueous dispersion of the casein or soy protein results in precipitating the protein. In such case, a larger amount of the acid is used to make the alkaline aqueous solution of the metal complex. Thus, if lactic acid is used, the amount thereof which is used to make the alkaline aqueous solution of the metal complex may be 250% of the minimum weight which would be required to make aluminum lactate or the like in the theoretical reaction.

It is also possible to make the new dissolved metal complex by dissolving in aqueous ammonium hydroxide a multivalent metal salt of the hydroxy-carboxylic acid above described.

These multivalent salts of said acids are exemplified by aluminum tartrate; ferric citrate, $FeC_6H_5O_7$; and ferric lactate, $Fe(C_3H_5O_3)_3$.

Thus, in the preceding example, the 12.8 units of $Al_2(SO_4)_3$ have substantially 2 units of atomic aluminum. This corresponds to substantially 18 units of aluminum tartrate. Hence 18 units of aluminum tartrate can be used, with excess ammonia, in place of the 12.8 units of $Al_2(SO_4)_3$ and the tartaric acid mentioned above.

Without limitation thereto, the multivalent salts which do not have the anions of said selected organic acids, and which can be used in combination with said organic acids or their carboxylates and ammonia and water, to form the desired dissolved metal complexes, are exemplified by the following:

| Salt: | Formula |
| --- | --- |
| Aluminum sulfate | $Al_2(SO_4)_3$ |
| Ferric chloride | $FeCl_3$ |
| Chromic nitrate | $Cr(NO_3)_3$ |
| Stannic sulfate | $Sn(SO_4)_2$ |
| Vanadyl sulfate (water-soluble form) | $(VO)_2(SO_4)_3$ |
| Zirconyl chloride | $ZrOCl_2$ |

Without limitation thereto, the hydroxy carboxylic acids and their equivalent carboxylates, are exemplified by the following:

HYDROXY-CARBOXY ACIDS

| Acid: | Formula |
| --- | --- |
| Tartaric | $HOOC(CHOH)_2COOH$ |
| Citric | $(COOH)CH_2C(OH)(COOH)CH_2COOH$ |
| Malic | $HOOCCH(OH)CH_2COOH$ |
| Lactic | $CH_3CHOH\ COOH$ |
| Glycolic | $HOCH_2COOH$ |
| Salicylic | $HOC_6H_4COOH$ |
| Hydracrylic | $CH_2OHCH_2COOH$ |

CARBOXYLATES

| Sodium salicylate | $Na(C_7H_5O_3)$ |
| --- | --- |
| Potassium lactate | $K(C_3H_5O_3)$ |
| Calcium lactate | $Ca(C_3H_5O_3)_2$ |

The ammonium salts and the alkali-metal salts are highly preferred.

In order to make the dissolved metal complex, it is highly preferred to use a multivalent salt which is ordinarily precipitated by ammonium hydroxide, an acid of the selected class or its carboxylate, and aqueous ammonia solution.

It is highly preferred to use citric acid, tartaric acid, or the ammonium salts or alkali-metal salts of these acids.

It is preferred to use multivalent salts of aluminum, tin and zirconium, because these metals form substantially colorless compounds with proteins. If a multivalent iron salt is used, the resultant ferric proteinate is colored.

In the following examples, to which the invention is not limited, all units are units by weight, such as grams, kilograms, etc. All operations were performed in air, at standard atmospheric pressure of about 760 millimeters of mercury. All operations were performed at 20° C.–30° C., unless a different temperature is stated. The ammonia water was an aqueous solution of ammonia, which had 28% by weight of dissolved ammonia.

In the following examples, the colloidal dispersion of the protein and the dissolved metal complex were separately prepared and then mixed, for convenience. However, a solution of the metal complex can be prepared in proper dilution and pH, and the protein can be directly dispersed in said solution of the metal complex.

*Example No. 1*

The liquid composition is useful as a water-proof adhesive or cement for wood.

STEP 1

*Making the colloidal dispersion.*—One hundred units of casein were thoroughly mixed and wetted with 300 units of water. Then 12 units of 28% ammonia water were added. The mixture was heated and stirred at 50° C. until a smooth and uniform dispersion was made. This dispersion is frequently designated as a solution.

STEP 2

*Making the solution of the metal complex.*—Thirty units of hydrated ferric chloride, $FeCl_3 \cdot 6H_2O$, whose formula weight is 270.30, and 25 units of tartaric acid were dissolved in 75 units of water. The 30 units of said hydrated ferric chloride corresponded to 18 units of $FeCl_3$.

Then 75 units of said 28% ammonia water were added, corresponding to 21 units of ammonia, and corresponding to about 44 units of ammonium hydroxide. A clear and strongly colored solution of the metal complex was formed.

The gram-equivalent weight of ferric chloride, $FeCl_3$, is 54.

Hence, in the ratio of their respective gram-equivalent weights, the 18 units of $FeCl_3$ correspond to substantially 25 units of tartaric acid.

In this example, if the ferric chloride could have been precipitated as ferric hydroxide, this could have been done by 7.2 units of ammonium hydroxide.

The solution of the metal complex had an excess of free or uncombined ammonia.

STEP 3

The dispersion of Step 1 and the solution of the metal complex of Step 2 were mixed to form the new combination glue dispersion, which remained stable, without any precipitation of ferric hydroxide or thickening of the glue.

Two square-shaped test pieces of wood veneer were used. The length of each side was 150 millimeters. The glue was spread upon one side of each piece, and the coated faces were pressed together, and the adhesive was allowed to dry in air for one week.

The glued pieces were then immersed in water at 20°–30° C. for two weeks, as a test. There was no evidence of failure in the glued joint.

Soy protein can be substituted for casein in the foregoing examples.

In following the method of Step 2 in making the dissolved metal complex, an initial solution of two substituted reactants can be made as stated in the following Table No. I, in 75 units of water, and this can then be mixed with the amount of said ammonia water which is mentioned in Table No. I.

TABLE NO. I

| Units of multivalent metal salt | Units of acid | Units of 28 percent ammonia water |
|---|---|---|
| $Al_2(SO_4)_3$, 12.8 | Tartaric, 10 | 25 |
| Do | Citric, 12 | 25 |
| Do | Malic, 12 | 25 |
| Do | Lactic, 50 | 50 |
| Do | Glycolic, 50 | 50 |
| Do | Salicylic, 20 | 30 |
| Do | Hydracrylic, 50 | 50 |
| $FeCl_3$, 12 | Citric, 12 | 25 |
| $Cr(NO_3)_3$, 18 | Tartaric, 10 | 25 |
| $Sn(SO_4)_2$, 22.5 | do | 25 |
| $(VO)_2(SO_4)_3$, 25 | Tartaric, 15 | 30 |
| $ZrOCl_2 \cdot 8H_2O$, 25 | do | 30 |

In the above the respective salts were $Al_2(SO_4)_3 \cdot 18H_2O$; $FeCl_3 \cdot 6H_2O$; $Cr(NO_3)_3 \cdot 9H_2O$; $Sn(SO_4)_2 \cdot 2H_2O$. Hence the above Table No. I states the units of the salts approximately, without their water of hydration.

Thus, in the first combination, 25 units of $$Al_2(SO_4)_3 \cdot 18H_2O$$

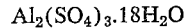

and 10 units of tartaric acid are dissolved in 75 units of water, and 25 units of 28% ammonia water are added. As above noted, 12.8 units of $Al_2(SO_4)_3$ require much more than 10 units of tartaric acid, if one molecule of $Al_2(SO_4)_3$ is reacted with three molecules of tartaric acid, in order to make aluminum tartrate in the theoretical reaction.

Many other combinations of Table No. I show the use of the acid in less than the theoretical ratio.

In one combination of Table No. I, 12.8 units of $Al_2(SO_4)_3$ were used per 50 units of lactic acid. In order theoretically to produce aluminum lactate by reacting aluminum sulfate and lactic acid, one molecule of aluminum sulfate must be reacted with six molecules of lactic acid. The molecular weight or formula weight of lactic acid is 90.05. Hence this would require 342.12 grams of aluminum sulfate per 540.30 grams of lactic acid, or substantially 1.6 grams of lactic acid per gram of aluminum sulfate. This would require only about 20 grams of lactic acid per 12.8 grams of aluminum sulfate. Hence, in this combination, lactic acid is used in about 250% of the amount required for the theoretical reaction. As above noted, this large excess of lactic acid is used, and 14 units of ammonia are used in this combination, in order to produce a solution of the respective metal complex which will not precipitate the aqueous alkaline dispersion of the casein or soy protein.

As in other examples, the amount of ammonia is in excess of the amount which would be required to form ammonium lactate.

*Example No. 2*

This illustrates a new combination dispersion in which fine particles of mineral pigment are dispersed, in order to provide a water-resistant paint.

STEP 1

Ten units of casein were mixed and wetted with 30 units of water. The mixture was then mixed and stirred with about 1.0 unit of said 28% ammonia water, at 50° C., to make the colloidal dispersion.

STEP 2

Fifteen units of finely-divided titanium dioxide pigment, 60 units of finely divided calcium carbonate pigment and 50 units of water were stirred into and thoroughly mixed with the dispersion of Step 1.

STEP 3

Two units of aluminum sulfate $Al_2(SO_4)_3$, and 1.5 units of citric acid were dissolved in 10 units of water. This solution was mixed with 5 units of said 28% ammonia water, corresponding to 1.4 units of dissolved ammonia.

This provided a clear and colorless solution of the metal complex.

STEP 4

The solution of the metal complex of Step 3 was mixed with the mixture of Step 2 to make the paint.

This liquid coating composition or paint was brushed upon a plastered surface and was allowed to dry. The dry coating residue could then be washed with soap and water without marring the surface of the dry paint.

As shown in the following examples, the invention is particularly useful in coating paper, paper products such as paper-board and the like, with a water-resistant and waterproof coating.

Example No. 3

This illustrates a coating composition and its use for producing a coated paper wrapper for boxes.

STEP 1

Fifteen units of soy protein, of medium viscosity, were wetted with 30 units of water to make a paste. This was mixed with a solution of two units of tetrasodium pyrophosphate $Na_4P_2O_7.10H_2O$, in twenty units of water. The mixture was stirred and heated at 50° C. to produce a colloidal dispersion of the soy protein. This is an example of the use of an alkali other than dissolved ammonia.

STEP 2

Four units of crystalline aluminum sulfate $$Al_2(SO_4)_3.18H_2O$$

were dissolved in 10 units of water.

Three units of tartaric acid were then dissolved in said solution.

Then 12 units of said 28% ammonia water were mixed with said solution, to make a substantially colorless solution of the metal complex.

This solution had a strong odor of free ammonia.

STEP 3

The colloidal dispersion of Step 1, and the solution of the metal complex of Step 2, were mixed without any precipitation or coagulation taking place.

STEP 4

Paper-coating clay, 100 units, was wet with 60 units of water containing dissolved therein 0.2 unit of tetrasodium pyrophosphate to form a clay slip.

STEP 5

The product of Step 3 and the clay slip of Step 4 were mixed to form an aqueous coating composition.

This coating composition was spread upon a paper base. The weight of the uncoated paper base was 74 grams per square meter. The dry weight of the coating was 23 grams per square meter.

The coated paper was dried and supercalendered in the usual manner.

The finished paper was of excellent appearance. The dry coating had satisfactory resistance to rubbing with a wet finger.

The dry coating had equal resistance to water, through the entire thickness of said dry coating.

This was tested by carefully scraping the top layer of the coating with a knife.

Example No. 4

This illustrates a mineral coating composition for coating printing paper, which results in an improved paper.

STEP 1

Fourteen units of casein were wetted with 40 units of water to make a smooth paste. This was mixed with 2.0 units of said 28% ammonia water at 50° C. to form a colloidal dispersion of the casein.

STEP 2

Sixty units of pigment clay, of the usual type used in making a coating on paper, and 40 units of fine-particle calcium carbonate pigment, were dispersed in a solution of 0.4 unit of tetrasodium pyrophosphate in 85 units of water.

The tetrasodium pyrophosphate was used to make a stable dispersion of the pigment.

STEP 3

The dispersion of Step 1 and the pigment suspension of Step 2 were mixed.

Then 0.25 unit of tributyl phosphate, $(C_4H_9)_3PO_4$, were added to said mixture, to prevent foaming.

STEP 4

3.5 units of the abovementioned hydrated aluminum sulfate were dissolved in 10 units of water. Three units of Rochelle salt, which is potassium-sodium tartrate, $KNaC_4H_4O_6.4H_2O$, were then dissolved in said 10 units of water.

Then 8 units of said 28% ammonia water were added to make the dissolved metal complex. The solution was clear.

This is an example of using a carboxylate of the organic acid.

STEP 5

The solution of the metal complex of Step 4 was mixed with the composition of Step 3, to form the desired coating composition, in which the protein was colloidally dispersed and the pigments were also dispersed in fine suspension.

This coating composition was applied to each side of a paper sheet, whose weight was 82 grams per square meter.

The weight of the dry coating on each side of the paper was about 20 grams per square meter.

This coated paper was dried and supercalendered in the usual manner.

The finished paper was of excellent quality for letter press printing and it was remarkably resistant to wet rubbing.

Example No. 4A

Example No. 4 was repeated except that in Step 1 the quantities of casein were increased from 14 to 18 units, and in Step 4 all quantities were increased by 25 percent. The resulting coated paper was found to be excellent for lithographic printing. There was no "scumming" on the lithographic press as usually occurs when coated paper containing calcium carbonate in its coating is printed by lithography.

It appears therefore that the thin film of aluminum caseinate surrounding or attached to each particle of calcium carbonate in said coating on said coated paper was effective in preventing or greatly slowing up the dissolving action upon the calcium carbonate of dilute acidic solutions, such as usual lithographic solutions. When a drop of dilute phosphoric acid of pH 3 was placed on the coated paper and immediately examined under a microscope substantially no evolution of gas was observed showing that substantially no carbonate was decomposed; a similar test on coated paper made identically therewith except for the omission of the aluminum complex showed immediate copious evolution of gas, and a similar test on coated paper made identically therewith except for substitution of an ammonical zinc complex in place of the aluminum complex also showed a considerable immediate evolution of gas.

A coated lithographic paper the coating of which contains particles of calcium carbonate protected by multivalent metal proteinate against deleterious action by lithographic solutions is a valuable new product.

*Example No. 5*

This shows another composition for coating paper for lithographic printing.

STEP 1

Twelve units of casein were mixed and wetted with 40 units of water to make a paste. This was mixed with 2.0 units of said 28% ammonia water at 50° C. until the casein was colloidally dispersed.

STEP 2

Seventy units of fine-particle clay pigment and 30 units of fine-particle calcium carbonate pigment were dispersed in a solution of 0.4 unit of sodium pyrophosphate in 80 units of water.

STEP 3

The dispersions of Step 1 and Step 2 were mixed. 0.5 unit of a silicone foam-dispersing agent was added.

STEP 4

Eight units of commercial zirconium acetate, $$Zr(C_2H_3O_2)_3OH$$

which is a basic acetate, were dissolved in 15 units of water.

Six units of tartaric acid were dissolved in said solution.

Then 18 units of said 28% ammonia water were mixed with said solution to provide the dissolved metal complex.

STEP 5

The dissolved metal complex of Step 4 was mixed with the composition of Step 3.

STEP 6

An aqueous latex of a styrene-butadiene copolymer was mixed with the composition of Step 5. This aqueous latex had a weight of 12.5 units.

Said aqueous latex had 6 units of the suspended styrene-butadiene copolymer.

This completed the coating composition. The starting protein, pigments and the styrene-butadiene copolymer particles formed a uniform and stable suspension. This composition, like the other compositions disclosed herein, had an excess of dissolved stabilizing ammonia, which maintained the dissolved metal complex.

This composition was spread upon each side of a paper base by the usual rolls. The weight of the final dry coating on each side of the paper was 20 grams per square meter.

This coated paper was dried and supercalendered in the usual manner.

The coated sheet was an excellent sheet for lithographic printing and its dry coatings were exceptionally resistant to water.

DRUM-FINISHED PAPER

The invention is of particular utility in making drum-finished coated paper. In making drum-finished coated paper, a paper web, which has a wet layer of coating material thereon, is pressed against a hot and smooth finishing surface, which is usually highly polished. This surface may be the chromium-surface of a chromium-plated rotating drum, which is suitably heated. This well-known process is shown in Bradner U. S. Patent No. 1,719,166, in which such coated paper is designated as "cast-coated" paper.

In making such coated paper, it is necessary that the wet coating should initially adhere accurately to the smooth finishing surface, and that the coating should be rapidly and readily and completely releasable from said finishing surface.

Tests have shown that if the wet coating layer is made with the use of a dissolved metal complex according to this invention, the wet coating sets and becomes thus releasable from the finishing surface in about one-half the time which is required in the case of a coating which is made without the use of said dissolved metal complex. This illustrates one of the great advantages of reacting the starting protein with the multivalent metal ions, while the starting protein is in the form of small and separated particles.

In addition to doubling the speed of this drum-finishing operation, the finished paper is of excellent quality for printing and is reliably resistant to rubbing when the coated paper is wetted with water.

*Example No. 6*

This illustrates a coating composition for use in making drum-finished coated paper.

STEP 1

Fourteen units of casein were wetted with a solution of 2.8 units of dicyandiamide in 30 units of water. The dicyandiamide is used to reduce the viscosity of the final coating composition. The formula of dicyandiamide is $(CN.NH_2)_2$. This wetted casein was mixed with 2.0 units of said 28% ammonia water at 50° C. until the starting protein was colloidally dispersed.

STEP 2

Seventy-five units of fine-particle coating clay pigment and 25 units of fine-particle calcium carbonate pigment were mixed in a heavy-duty sigma-blade mixer with the dispersion of Step 1, and also with 35 units of water, to provide a thick mass.

STEP 3

0.5 unit of a silicone foam-dispersing agent, and 12.5 units of an aqueous latex of emulsion-polymerized styrene-butadiene copolymer, which contained 6 units of said copolymer, were stirred into the mixture of Step 2.

STEP 4

1.4 units of anhydrous aluminum sulfate and 1.0 unit of tartaric acid were dissolved in 12 units of water.

Twelve units of said 28% ammonia water were added. The resultant solution of the metal complex was alkaline to litmus, had a strong odor of ammonia.

STEP 5

The solution of the metal complex of Step 4 was added to the composition of Step 3, to complete the coating composition.

This coating composition was applied by a transfer-roll coater to one side of sized paper. The weight of the uncoated paper was about 120 grams per square meter. The weight of the dry coating was about 26 grams per square meter.

The freshly-coated sheet, in which the coating contained its original water and all of the original dissolved metal complex, was run into contact with a heated, polished chromium-plated drum, while the entering space between the coated paper and the cylindrical drum was kept filled with water, as disclosed in U. S. Patent No. 2,678,890.

The coating was set and dried, and the sheet was released from the drum in 4 seconds. The same coating, save that the dissolved metal complex was omitted, required a period of eight seconds, prior to releasing.

The finished sheet was a glossy paper of this "cast-coat" type. It was substantially free from defects. Its surface was resistant to water and was not marked by contact with water. It was suitable for printing of the highest quality.

This test shows that the formation of the final proteinate requires only a short period.

The above examples have illustrated new and improved liquid compositions, in which the liquid medium or solvent is composed wholly of water. However, in many cases, in which the protein is not casein or soy protein.

the solvent may be a mixed solvent, of which water is a part.

In making water paints, it is well-known to grind pigments and casein or other protein together in the dry state, together with a little preservative. If casein or soy protein is the binder, an alkaline mixture is made. Such mixtures disperse readily in water.

Hence, it is within the scope of the invention to make a dry mixture or a paste mixture of the finely divided protein, of salt of a multivalent metal such as aluminum sulfate in powdered form, an acid such as tartaric acid in powdered form, and to dissolve said mixture in ammonia water at the place of use, thus producing the desired new combination dispersion or solution. Other ingredients may be included in the dry composition such as pigment.

These dry or paste mixtures may contain a small amount of an alkali, such as sodium pyrophosphate.

The dry or paste combinations described herein, without the ammonia water, are within the scope of the invention.

It is well-known to produce self-supporting films, by drying a liquid composition of a plastic on a smooth polished surface of chromium, nickle, silver, etc., and then stripping the film from said surface. This well-known method and other methods of making such independent or self-supporting films, are described in "Handbook of Plastics" by Simonds & Ellis, published in 1943 by D. Van Nostrand Company, Inc.

The new combination dispersions, in which dyes may also be dissolved, can be thus used to make self-supporting films.

The liquid compositions may be dried by spray-drying or drum-drying, to provide particles or flakes of the final modified protein. Thus the liquid compositions may be dried by applying them to a hot drum which has a smooth and polished chromium face, and the dried protein can be scraped from said drum in particles or flakes.

It is known to make fibers from casein or other proteins, to be used in the manufacture of fabrics. Various proteins and their use in making fibers, are described in "The New Fibers," by Sherman and Sherman, published in 1946 by D. Van Nostrand Company Inc.

In making casein fiber, a solution of the casein of low alkalinity is forced in the form of thin streams into a formaldehyde hardening and water-proofing solution. The improved compositions make it possible to eliminate the use of formaldehyde solution. They may be forced in the form of thin streams into an acid solution which promptly breaks up the dissolved metal complex. Also, if the final modified protein is produced in dry form by spray drying or drum drying, an alkaline aqueous dispersion or solution thereof may be forced in thin streams into an acid bath.

Soy protein has been used to make fibers, in the form of a concentrated aged solution which is forced in thin streams into an acid coagulating bath. The new liquid compositions can be thus used, or the dry protein can be re-dissolved or re-dispersed in an alkaline aqueous dispersion, like the other final modified proteins, and such solution can be used in the well-known process of making soy protein fiber.

Many other proteins have been used in making fibers, including fibrous proteins and globular proteins, and these proteins are included in the broad scope of the invention, although, as above noted, casein and soy protein are highly preferred and are especially adapted and critical for the desired purposes.

The abovementioned book "The New Fibers" and the patents and technical literature cited therein, and other patents and technical literature, disclose numerous proteins other than the highly-preferred casein and soy protein, and numerous other dispersing agents and liquid media for dispersing the protein. These alternatives are within the broad scope of the invention.

As a general rule, the pH of the solution of the metal complex is in a range of 9 to 12, as measured at substantially 20° C.

As a general rule, the pH of the new combination dispersion is in the range of 9 to 12, as measured at substantially 20° C.

These pH values correspond particularly to the above examples.

When a combination dispersion which is made according to said examples is evaporated in a glass beaker, the pH thereof is decreased.

When the solution of a novel metal complex is thus evaporated in a glass beaker, the pH thereof is decreased.

The formulas of the new metal complexes are uncertain, and it is very difficult, and probably impossible, to state such formulas, because said metal complexes are decomposed when the aqueous solvent or mixed solvent which includes water, is evaporated.

For the purposes of claiming the invention, those carboxylates of the organic acids which are soluble in alkaline aqueous medium are included within the claims, whenever an organic acid is mentioned.

The only possible definition for the new metal complexes is as follows:

DEFINITION OF NEW METAL COMPLEXES

An alkaline solution of a metal complex which is the reaction product of multivalent metal ions, the anion of an hydroxy-carboxylic acid, and ammonium hydroxide, said multivalent ions being stable in said solution against precipitation by said ammonium hydroxide, the valences of said multivalent metal ions being bound in said complex, to prevent precipitation of dispersed particles of protein in an alkaline aqueous dispersion of said protein, in whose aqueous medium said metal complex is dissolved, said metal complex being broken by evaporation of its solvent to release said multivalent metal ions.

This definition includes derivatives of the hydroxy-carboxylic acids, if said derivatives have one or more hydroxyl groups, or one or more carboxyl groups.

This definition includes the reaction product of a protein-precipitating multivalent salt, a selected acid, and ammonia water. It also includes the reaction product of a salt of a multivalent metal and a selected acid, and ammonia water.

This definition includes a solvent which is wholly water, or a mixed solvent which includes water.

While ammonia water is the highly preferred reactant, other water-soluble hydroxyl compounds can be used; such as amines, e. g. morpholine, alkanolamines, primary, secondary, and tertiary amines, which are soluble in water to yield hydroxyl ions and which can be decomposed or driven off by evaporating the solvent of the metal complex at 20° C.–30° C. or at higher temperature to reduce the alkalinity of the solution. The invention is not limited to any particular temperature above 30° C.

Ammonium hydroxide is highly preferred, because it is so unstable that it exists only in solution.

The formulas of the new modified proteins are not known.

The starting proteins are of the type which react with multivalent metal ions.

The starting proteins are thus reacted while said starting proteins are in the colloidal state, in which the mean size of the particles is between molecular size and a size great enough to be visible to the eye or in the optical microscope.

The particle size may be less than four microns.

Hence the improved modified protein consists of aggregates of particles of colloidal size, in which said particles have been reacted at their entire surfaces with multivalent ions.

An independent film or coating film of the modified protein can be formed, which consists of aggregated colloidal-size particles of the modified protein, in which the colloidal-size particles have been thus reacted in situ during the aggregation thereof.

If the independent film or coating film has particles of mineral pigment or other particles in addition to the modified protein, the modified protein consists of such aggregated particles.

The size of the mass of modified casein or soy protein or of other modified protein in which the starting protein is reactive with multivalent ions, may be small in particles or flakes of the modified protein. However, these particles or flakes consist of aggregates of colloidal-size particles.

The abovementioned adhesives and binders have aggregated masses of the modified colloidal-size particles of casein and soy protein.

The colloidal-size particles are modified in situ in said masses, namely, in the formation of said masses, as distinguished from a surface application to a surface of said mass, which has aggregates which greatly exceed the colloidal size.

Whenever a layer is referred to in the appended claims, this may be an independent or self-supporting layer, or it may be a coating layer.

I claim:

1. The process of forming a film employing as a component a soluble, modified protein and subsequently insolubilizing said protein in situ in said film comprising the steps of colloidally dispersing a modified protein in an alkaline aqueous liquid medium, mixing therewith a relatively stable basic inner complex chelate salt containing in its ring at least one radical having a multivalent metal ion, said chelate salt also containing a hydroxyl radical for suppressing the protein insolubilizing action of said multivalent metal ion, regulating the amount of said complex salt in said medium to provide said multivalent ions in sufficient quantity with respect to the said protein to insolubilize substantially all of said protein, applying said colloidally dispersed protein and dissolved complex salt to a supporting base to form a film while said protein is still in the colloidally dispersed state, and thereafter substantially simultaneously and uniformly insolubilizing said protein in situ throughout said film by eliminating said hydroxyl radicals from said complex salt.

2. The process of forming a film as defined in claim 1, further characterized by forming said film on a paper web and substantially simultaneously with the step of insolubilizing said protein applying the surface of said film to the surface of a finishing drum whereby a cast surface is produced.

References Cited in the file of this patent

UNITED STATES PATENTS

| | | |
|---|---|---|
| 2,034,435 | Heritage | Mar. 17, 1936 |
| 2,073,666 | Wernlund | Mar. 16, 1937 |
| 2,103,153 | Dunham | Dec. 21, 1937 |
| 2,210,481 | Brother et al. | Aug. 6, 1940 |
| 2,296,108 | Kinney | Sept. 15, 1942 |
| 2,346,812 | Bradner | Apr. 18, 1944 |
| 2,570,561 | Kinney | Oct. 9, 1951 |